US010978835B2

(12) United States Patent
Huang et al.

(10) Patent No.: US 10,978,835 B2
(45) Date of Patent: Apr. 13, 2021

(54) POWER CONNECTOR

(71) Applicant: DELTA ELECTRONICS, INC., Taoyuan (TW)

(72) Inventors: Chin-Chu Huang, Taoyuan (TW); Tzu-Hao Lo, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 486 days.

(21) Appl. No.: 15/922,847

(22) Filed: Mar. 15, 2018

(65) Prior Publication Data

US 2019/0148893 A1 May 16, 2019

(30) Foreign Application Priority Data

Nov. 13, 2017 (TW) .................. 106139163

(51) Int. Cl.
*H02H 5/00* (2006.01)
*H01R 13/713* (2006.01)
*H01R 13/66* (2006.01)
*H01R 24/30* (2011.01)
*G01K 1/16* (2006.01)
*H02H 5/04* (2006.01)
*H01R 103/00* (2006.01)

(52) U.S. Cl.
CPC .......... *H01R 13/7137* (2013.01); *G01K 1/16* (2013.01); *H01R 13/6683* (2013.01); *H01R 24/30* (2013.01); *H02H 5/04* (2013.01); *H01R 2103/00* (2013.01)

(58) Field of Classification Search
None
See application file for complete search history.

(56) References Cited

U.S. PATENT DOCUMENTS

| 6,210,036 | B1* | 4/2001 | Eberle ............... H01R 13/6683 |
| | | | 337/2 |
| 9,450,347 | B2 | 9/2016 | Kondou et al. |
| 9,589,745 | B2 | 3/2017 | Kondou et al. |
| 9,590,367 | B1* | 3/2017 | Sumner ............. H01R 13/6691 |
| 9,653,854 | B2 | 5/2017 | Kawamoto et al. |
| 2014/0070629 | A1 | 3/2014 | Kondou et al. |
| 2014/0148045 | A1 | 5/2014 | Kashiwada et al. |
| 2015/0171567 | A1 | 6/2015 | Kawamoto et al. |
| 2016/0013597 | A1 | 1/2016 | Huang |

(Continued)

FOREIGN PATENT DOCUMENTS

| CN | 201163690 Y | 12/2008 |
| CN | 204011992 U | 12/2014 |
| CN | 105229869 A | 1/2016 |

(Continued)

*Primary Examiner* — Stephen W Jackson
(74) *Attorney, Agent, or Firm* — CKC & Partners Co., LLC

(57) ABSTRACT

A power connector includes an insulation body, at least two pins, a thermal conductive element, and a thermal sensor. The insulation body has a cavity and a first housing, and the first housing includes a plug-in surface. The pins pass through the first housing, and one side of the pins extends to the cavity. The thermally and electrically conductive element is disposed in the cavity and extends to the pins, and is spaced apart from the pins. The thermally and electrically conductive element is close to the first housing. The thermal sensor is disposed in the thermally and electrically conductive element.

21 Claims, 12 Drawing Sheets

(56) References Cited

U.S. PATENT DOCUMENTS

2016/0344144 A1 11/2016 Wu et al.
2017/0358890 A1 12/2017 Chen et al.

FOREIGN PATENT DOCUMENTS

| CN | 107112698 A | 8/2017 |
|---|---|---|
| EP | 2884600 A1 | 6/2015 |
| JP | 2009043509 A | 2/2009 |
| JP | 2014056678 A | 3/2014 |
| JP | 2014107151 A | 6/2014 |
| TW | 201603415 A | 1/2016 |
| TW | I548168 B | 9/2016 |
| WO | 2016081909 A1 | 5/2016 |

* cited by examiner

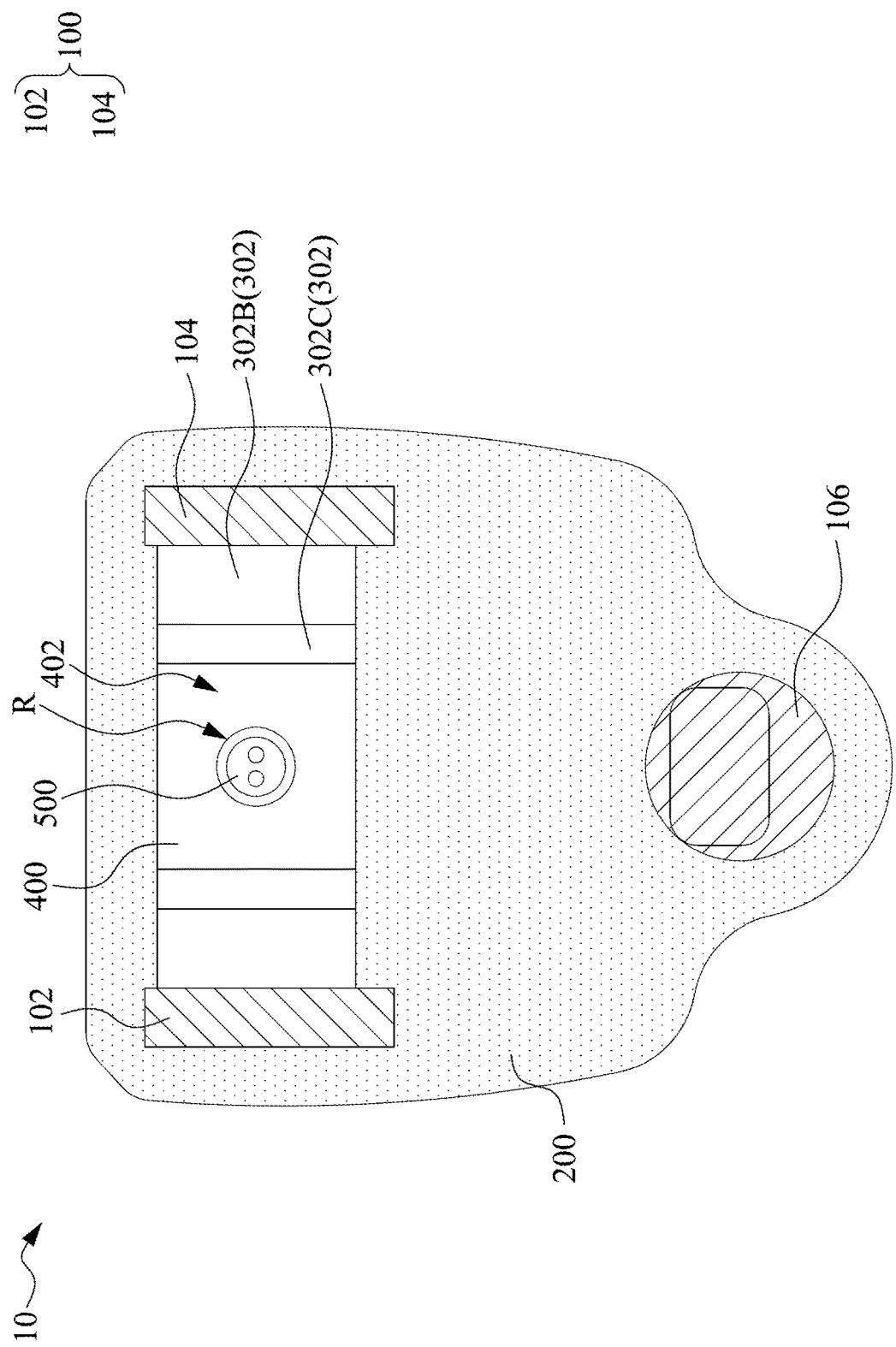

POWER CONNECTOR

RELATED APPLICATIONS

This application claims priority to Taiwan Application Serial Number 106139163, filed Nov. 13, 2017, which is herein incorporated by reference.

BACKGROUND

Field of Invention

The present disclosure relates to a power connector. More particularly, the present disclosure relates to a power connector having thermal sensor.

Description of Related Art

During operation of an electronic device or equipment, a power connector for alternating current (AC) has been used for an electrical connection to receive power from mains electricity or a power supply.

Generally, during a power supplying operation, if a shrapnel of a socket is loosened, a contact area between a copper sheet of the socket and a pin of an electrical connector may decrease, thereby increasing the impedance therebetween and further raising temperature in the contact area. Alternatively, when an electronic device requires high power or is operated under a long-term high-voltage environment, temperatures of a power connector and conductive lines connected thereto may be increased accordingly. Further, some abnormal conditions, such as dust accumulation, or human negligence may cause a temperature of a contact area to be increased as well. Such issues may cause, for example, housings of conventional power connector or socket to be melted or burned. In other words, the conventional power connector without a thermal sensor may be operated at the risk of being melted or burned.

Thus, to meet requirements of higher sensing accuracy and rapid temperature response of thermal sensor for addressing the aforementioned issues, an advanced power connector and its thermal sensing device are needed to be developed.

SUMMARY

The present disclosure provides a power connector including plural pins, an insulating body, a thermally and electrically conductive element, and a thermal sensor. The insulating body has a cavity and a first housing. The pins pass through the first housing. The thermally and electrically conductive element is disposed in the cavity. The thermally and electrically conductive element is close to the first housing, and is disposed between and spatially apart from the pins. The thermal sensor is embedded in the thermally and electrically conductive element. The object of the present disclosure is to enable the thermally and electrically conductive element to conduct heat to the thermal sensor effectively, thereby preventing heat loss to improve the sensing accuracy of the thermal sensor.

BRIEF DESCRIPTION OF THE DRAWINGS

The disclosure can be more fully understood by reading the following detailed description of the embodiment, with reference made to the accompanying drawings as follows:

FIG. 1D is a cross-sectional view cut along line B-B of FIG. 1A.

DETAILED DESCRIPTION

Figure 1A:
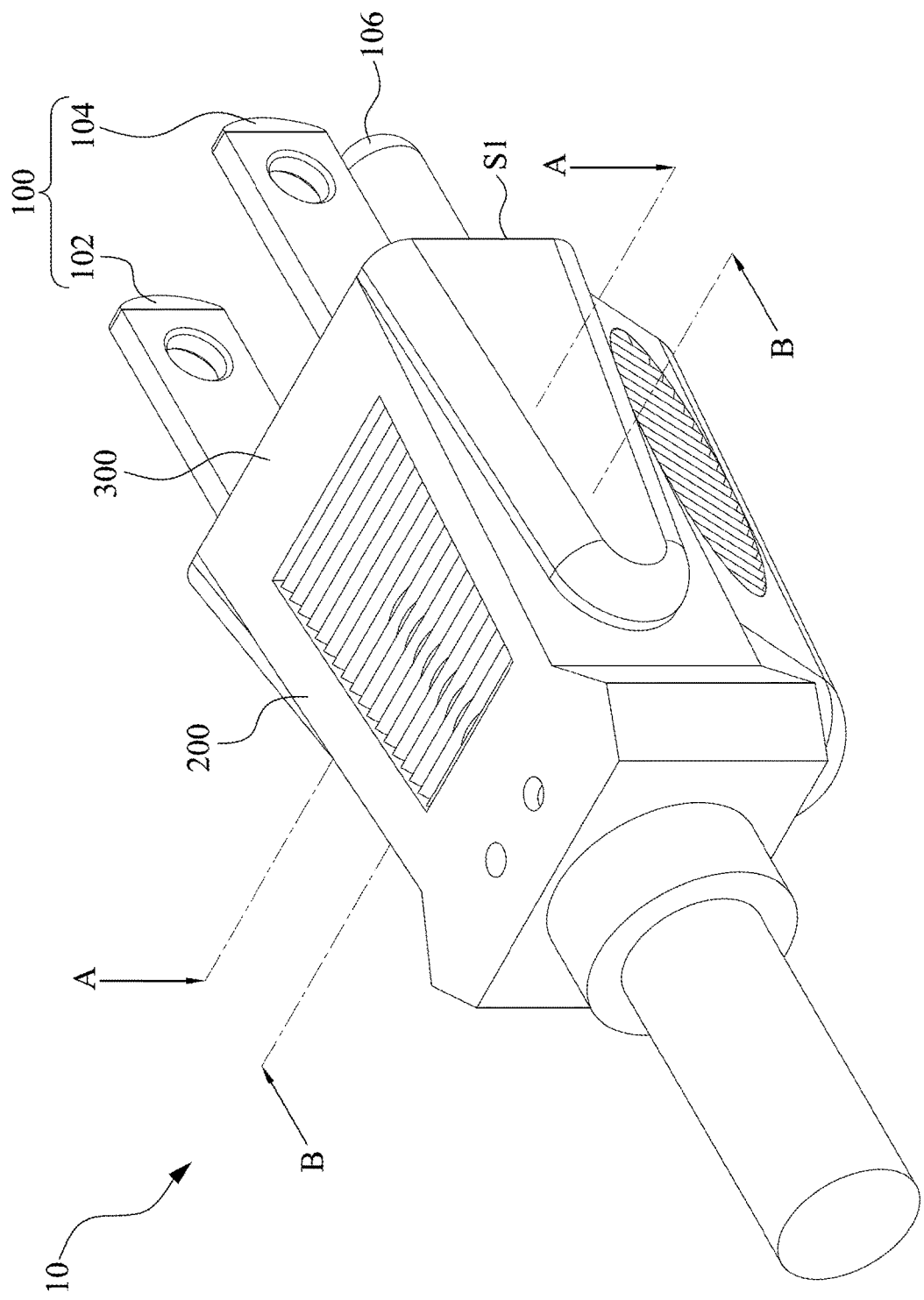
FIG. 1A is a schematic view of a power connector in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
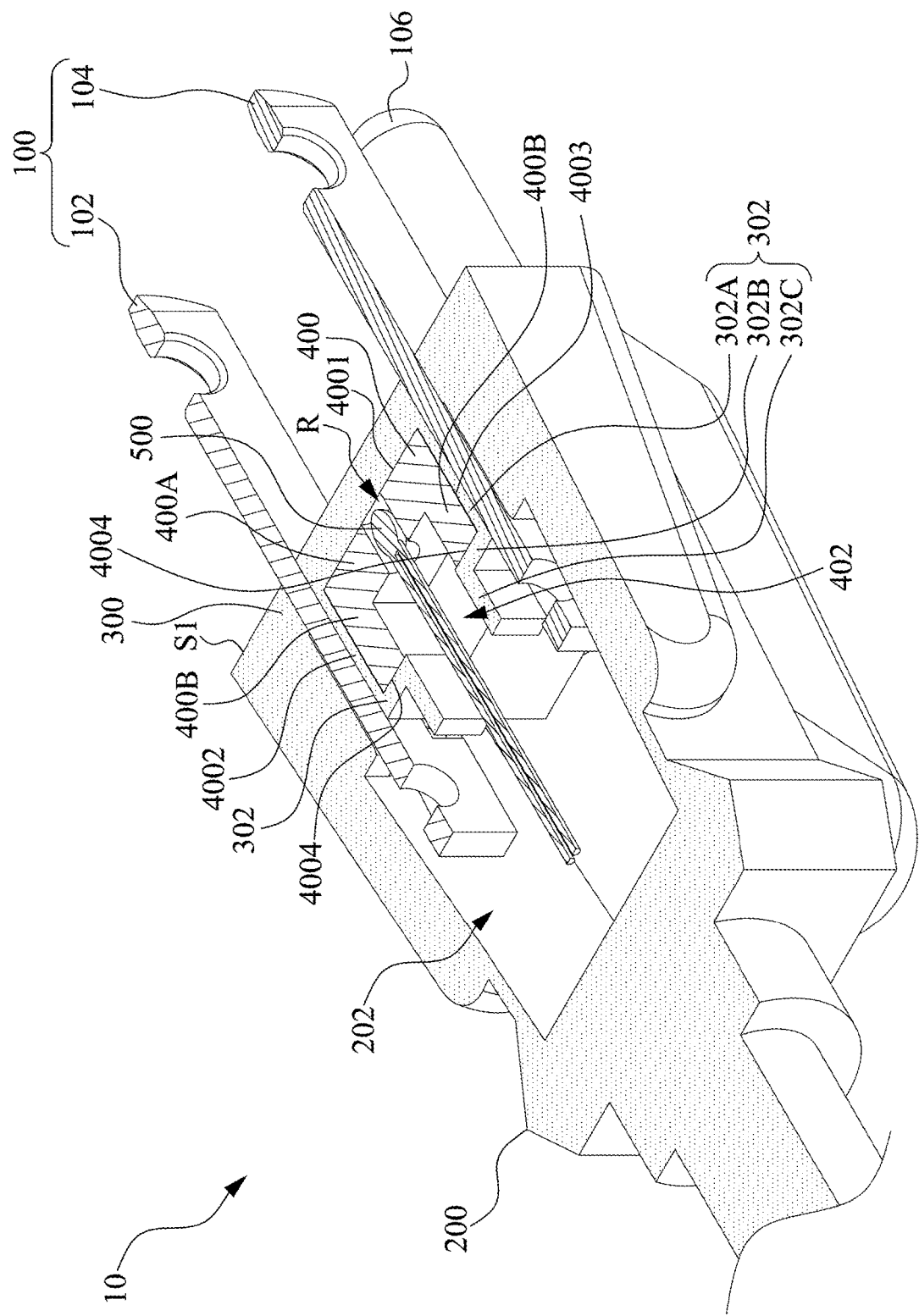
FIG. 1B is a perspective view cut along line A-A of FIG. 1A.
Figure 1C:
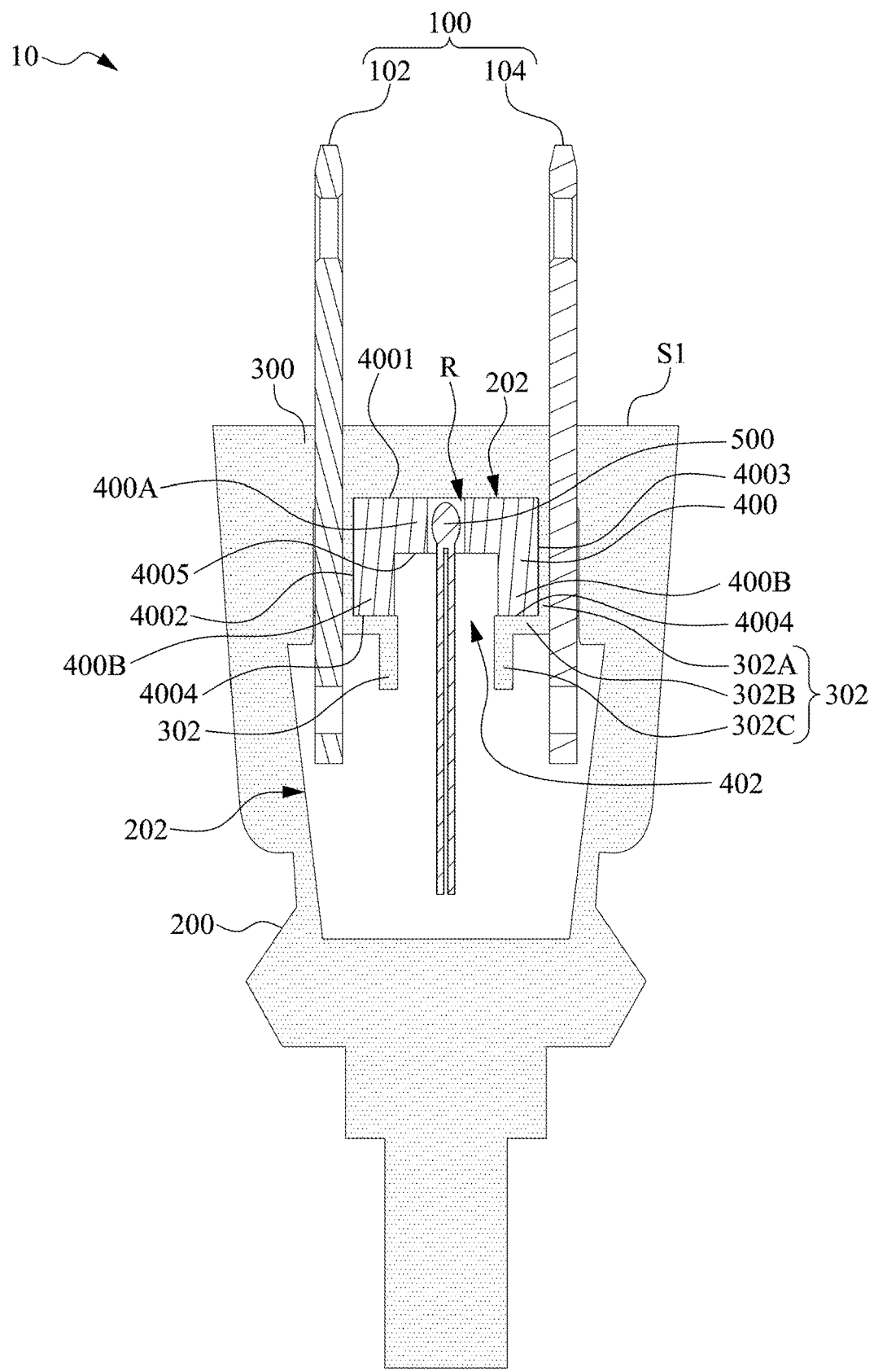
FIG. 1C is a plan view of the power connector in FIG. 1B.

FIG. 1A is a schematic view of a power connector in accordance with some embodiments of the present disclosure. FIG. 1B is a perspective view cut along line A-A of FIG. 1A. FIG. 1C is a cross-sectional view of the power connector in FIG. 1B. FIG. 1D is a cross-sectional view cut along line B-B of FIG. 1A.

A power connector 10 includes plural pins 100, an insulating body 200, a thermally and electrically conductive element 400, and a thermal sensor 500. The insulating body 200 may also be referred to as electrically insulating body 200. The insulating body 200 includes plural housings, one of which is a first housing 300 disposed at the front of the insulating body 200. Generally, the housings of the insulating body 200 are monolithically formed, and define a cavity 202, in which some elements of the power connector 10 are disposed in the cavity 202. An outer surface of the first housing 300 may be referred to as a plug-in surface S1. In some embodiments, the plug-in surface S1 is substantially flat. Once the power connector 10 is connected to an external socket, the plug-in surface S1 may correspond to a surface of the external socket. In some embodiments, the insulating body 200 may be made of insulating material and flame-retardant material. In some embodiments, the insulating body 200 may be plastic, rubber, or another suitable material.

The pins 100 pass through the first housing 300. One side of the pins extends into the cavity 202 of the insulating body 200, and another side of the pins is disposed outward from the plug-in surface S1 for connecting to an external socket. The pins 100 include a first pin 102, a second pin 104, and a third pin 106. In some embodiments, the first pin 102 may be connected to a live-wire (L) of AC, and the second pin 104 may be connected to a naught wire (N) of AC. Alternatively, the first pin 102 may be connected to a naught wire of AC, and the second pin 104 may be connected to a live wire of AC. The third pin 106 may be an earth wire (or a ground terminal). In some embodiments, the third pin 106 may be omitted. The first pin 102, the second pin 104, and the third pin 106 may be formed from a conductive material, such as copper alloy. Further, shapes of the first pin 102, the second pin 104, and the third pin 106 may be designed according to various country specifications.

The thermally and electrically conductive element 400 and the thermal sensor 500 are disposed in the cavity 202 of the insulating body 200. The thermally and electrically conductive element 400 is close to the first housing, and is disposed between the first pin 102 and the second pin 104. In some embodiments, the thermally and electrically conductive element 400 is in direct contact with the first housing 300. On the other hand, the cavity 202 may not be filled with other insulating materials, so as to reduce heat loss during heat conduction from the thermally and electrically conductive element 400 to the thermal sensor 500. As such, the thermal sensor 500 may maintain high sensing accuracy.

The thermally and electrically conductive element 400 may be a low-resistance material, such as metal, graphite, or another suitable conductive material that is different from the insulating material. In the present embodiment, the thermally and electrically conductive element 400 is formed from aluminum (Al) of which the thermal conductivity is about 237 (W/m·k). In some embodiments, the thermally and electrically conductive element 400 may be selected from conductive materials having thermal conductivities higher than 30 (W/m·k).

In some embodiments, the thermal sensor 500 may be a thermistor, such as a negative temperature coefficient (NTC) thermistor or a positive temperature coefficient (PTC) thermistor. Generally, a thermistor is sensitive to temperature, and may reflect true temperature changes, thereby detecting the temperature of the pins 100 of the power connector 10.

Reference is made to FIGS. 1C and 1D. In some embodiments, the thermally and electrically conductive element 400 is entirely disposed in the insulating body 200. Stated differently, the insulating body 200 substantially encloses the thermally and electrically conductive element 400, and the first housing 300 covers the thermally and electrically conductive element 400. In the present embodiment, the thermally and electrically conductive element 400 is in a U-shape. From other perspective, the thermally and electrically conductive element 400 includes a first portion 400A and two second portions 400B connected to the first portion 400A, in which the first portion 400A is in direct contact with the first housing 300, and the second portions 400B are respectively close to the pins 100. The extension direction of the first portion 400A crosses the extension direction of the second portions 400B, and the second portions 400B extend from opposite sides of the first portion 400A. In other words, the first portion 400A extends to a direction substantially parallel to the plug-in surface S1, and the second portions 400B extends to a direction substantially parallel to the first pin 102 and the second pin 104. The first portion 400A and the second portions 400B collectively form an accommodation space 402.

It is noted that the thermally and electrically conductive element 400 is spatially apart from the pins 100. Referring to FIG. 1C, in one embodiment of the present disclosure, the first portion 400A extends toward the first pin 102 and the second pin 104, but is not in contact with the first pin 102 and the second pin 104. The insulating body 200 further includes an extension portion 302. In the present embodiment, the extension portion 302 and the first housing 300 are connected and monolithically formed. The extension portion 302 extends toward the cavity 202. The extension portion 302 includes a first extension portion 302A that is at least disposed between the thermally and electrically conductive element 400 and the first pin 102 (or second pin 104), so as to spatially separate the thermally and electrically conductive element 400 from the pins 100. If the thermally and electrically conductive element 400 contacts any one of the pins 100, a high current may be delivered to the thermally and electrically conductive element 400 and may destroy the thermal sensor 500. In addition, since the thermally and electrically conductive element 400 and the pins 100 are spatially separated, the thermal sensor 500 is also spatially apart from the pins 100, accordingly. Thus, in a layout design, the pins 100 and the thermal sensor 500 may be designed at a primary side and a secondary side of a circuit board respectively. Since the primary side has a relatively higher current flow, the thermal sensor 500 disposed at the secondary side may be prevented from being destroyed by the high current flow.

The shortest distance measured along an insulating surface between two adjacent conductors may be defined as a creepage distance (CR). The creepage distance should comply with provisions of various countries. In the present disclosure, the thermally and electrically conductive element 400 has a top surface 4001, two opposite side surfaces 4002 and 4003, and a bottom surface 4004. The top surface 4001 is close to the plug in surface S1, the side surfaces 4002 and 4003 correspond to the first pin 102 and the second pin 104 respectively, and the bottom surface 4004 is opposite to the top surface 4001. In detail, the bottom surface 4004 is bottom surfaces of the second portions 400B of the thermally and electrically conductive element 400. Generally, the top surface 4001 is covered by the first housing 300, and the side surfaces 4002 and 4003 are covered by the first extension portions 302A. To increase the creepage distance, a first extension portion 302A may extend toward the accommodation space 402 along the bottom surface 4004 to form a second extension portion 302B. In other words, the second extension portion 302B at least partially covers the bottom surface 4004.

In the present disclosure, the second extension portion 302B further extends from the bottom surface 4004 toward a direction away from the plug-in surface S1 to form a third extension portion 302C. In some embodiments, the third extension portion 302C extends to a direction substantially parallel to the first pin 102 and the second pin 104. That is, the extension portion 302 may be a monolithic structure with two bent portions. In some other embodiments, the length and shape of the extension portion 302 may be designed to comply with safety regulations of various countries. Under the safety regulations, the extension portion 302 may only include the first extension portion 302A and the second extension portion 302B (e.g. the embodiment shown in FIGS. 3A and 3B). In some other embodiments, the extension portion 302 may only include the first extension portion 302A (e.g. the embodiment shown in FIG. 1F).

In the present disclosure, as shown in FIGS. 1B and 1C, the first portion 400A of the thermally and electrically conductive element 400 has a trench R extending from the accommodation space 402 toward the first housing 300. The thermal sensor 500 is disposed in the trench R. In some embodiments, the trench R may pass through the first portion 400A of the thermally and electrically conductive element 400, such that the first housing 300 spatially communicates with the cavity 202 (or accommodation space 402). Thus, the thermal sensor 500 may be embedded in the trench R and directly fixed on the first housing 300. The thermal sensor 500 may be fixed on the first housing 300 by glue dispensing or screw locking.

Figure 1E:
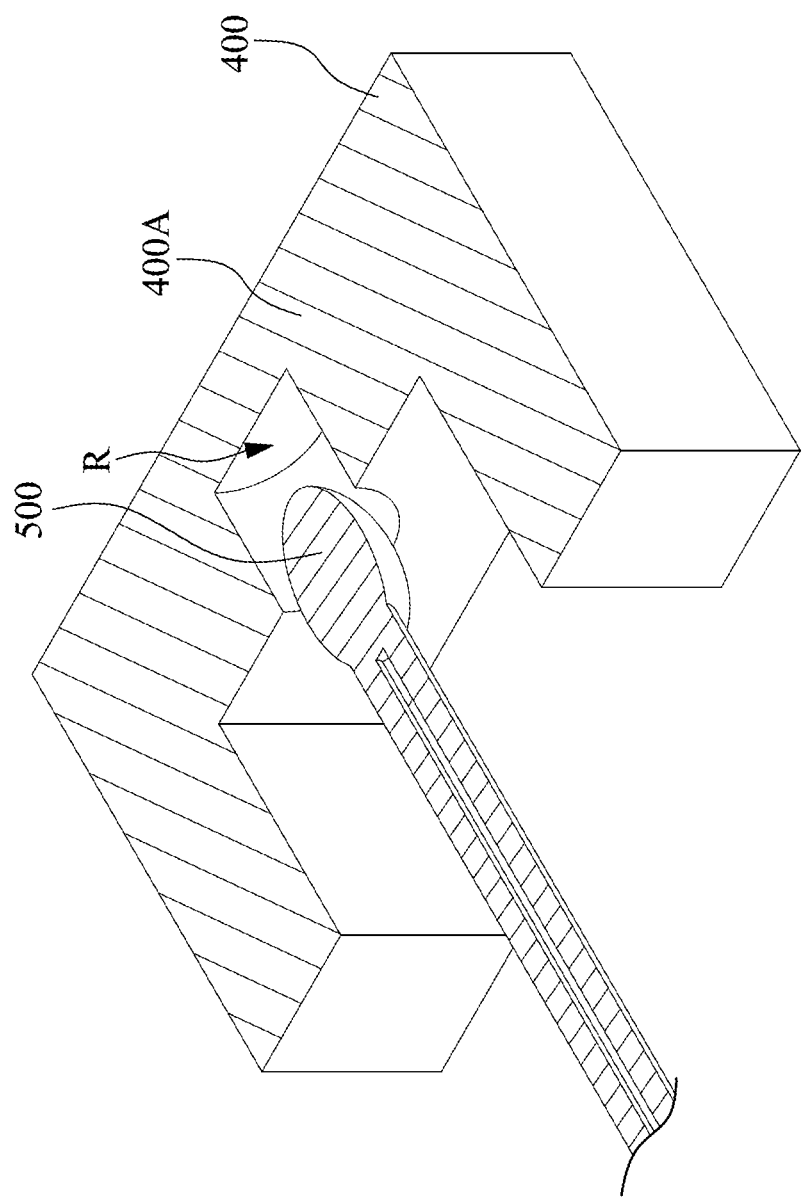
FIG. 1E is a schematic view of a thermally and electrically conductive element in accordance with some embodiments of the present disclosure.

Reference is made to FIG. 1E. In some other embodiments, the trench R does not entirely pass through the first portion 400A of the thermally and electrically conductive element 400, and the thermal sensor 500 may be fixed in the trench R by glue dispensing or screw locking. In various embodiments, the thermally and electrically conductive element 400 does not have the trench R, and the thermal sensor 500 may be fixed on an inner surface 4005 of the thermally and electrically conductive element 400. In other words, the thermal sensor 500 is disposed in the accommodation space 402, and details will be described in FIG. 2B.

Referring back to FIGS. 1B and 1C, from the perspective of heat conduction, the first portion 400A substantially extends substantially parallel to the plug-in surface S1 and is close to the first housing 300. As such, heat from the plug-in surface S1 may be conducted to the thermal sensor 500 uniformly and rapidly. On the other hand, two second portions 400B are close to the first pin 102 and the second pin 104 respectively, and extend substantially parallel to the first pin 102 and the second pin 104. As such, heat from the first pin 102 and the second pin 104 may be conducted to the thermal sensor 500 uniformly and rapidly. During operation, the plug-in surface S1 has a higher temperature than other elements as being close to the external socket, and the first pin 102 and the second pin 104 with a higher thermal conductivity also have a higher temperature. As such, under the safety regulations, by surrounding the thermal sensor with a conductor, the heat conduction efficiency can be increased.

Figure 1F:
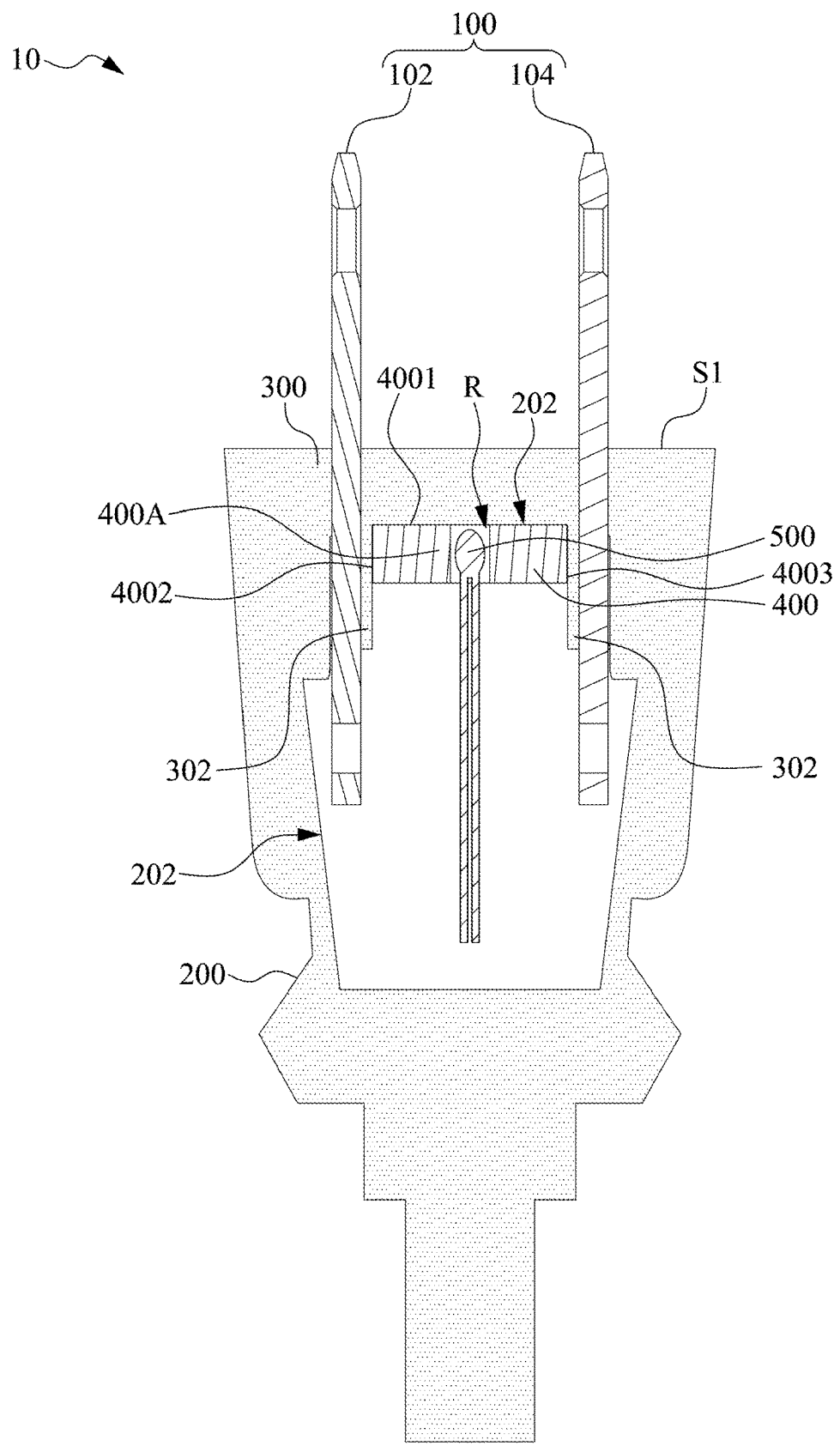
FIG. 1F is a cross-sectional view of a power connector in accordance with some embodiments of the present disclosure.

Further, the thermally and electrically conductive element 400 may not be limited to a U-shape. The thermally and electrically conductive element 400 can be feasibly shaped as long as heat can be effectively transferred from the pins 100 to the thermal sensor 500. Referring to FIG. 1F, in some embodiments, the thermally and electrically conductive element 400 is in a linear shape. That is, the thermally and electrically conductive element 400 only include the first portion 400A, and does not have the accommodation space 402, but with three surfaces corresponding to the plug-in surface S1 and the pins 100, as described above. In some embodiments, the first portion 400A may include a trench R, and the trench R may or may not pass through the first portion 400A of the thermally and electrically conductive element 400.

Figure 2A:
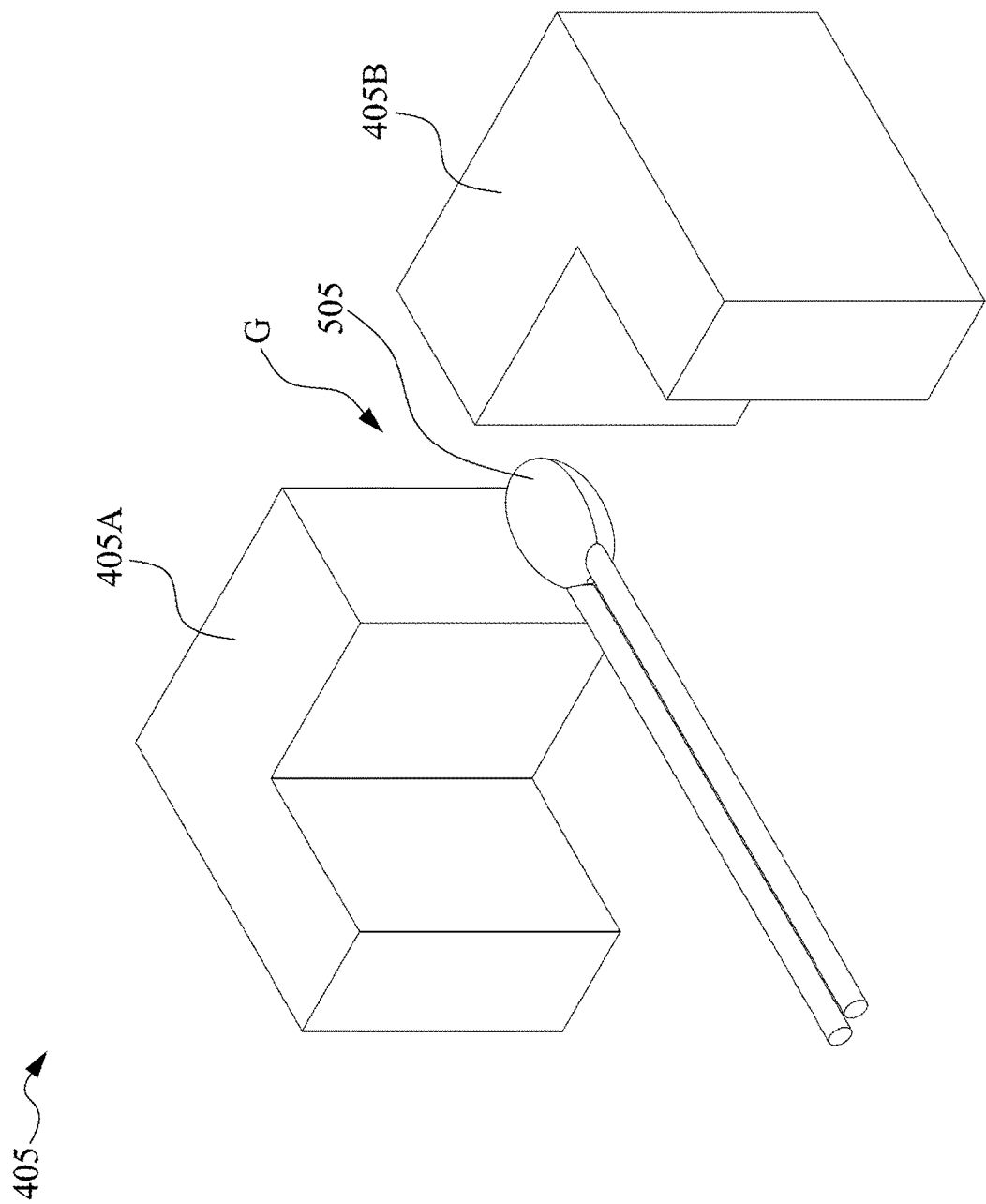
FIGS. 2A and 2B are schematic views of a thermally and electrically conductive element in accordance with some embodiments of the present disclosure.

FIG. 2A is a schematic view of a thermally and electrically conductive element in accordance with some embodiments of the present disclosure. A thermally and electrically conductive element 405 in FIG. 2A is similar to the thermally and electrically conductive element 400 shown in FIGS. 1B and 1C. The difference therebetween is that the trench of the thermally and electrically conductive element 405 in FIG. 2A can be a gap G dividing the thermally and electrically conductive element 405 into two pieces. From other perspective, the embodiment of FIG. 2A can be regarded as including a first thermally and electrically conductive element 405A and a second thermally and electrically conductive element 405B with L-shape, in which the first thermally and electrically conductive element 405A and the second thermally and electrically conductive element 405B are collectively formed in a U-shape with the gap G existing therebetween. In some embodiments, a thermal sensor 505 is disposed in the gap G, and may be fixed on the thermally and electrically conductive element 405 and/or the first housing 300 by glue dispensing or screw locking.

Figure 2B:
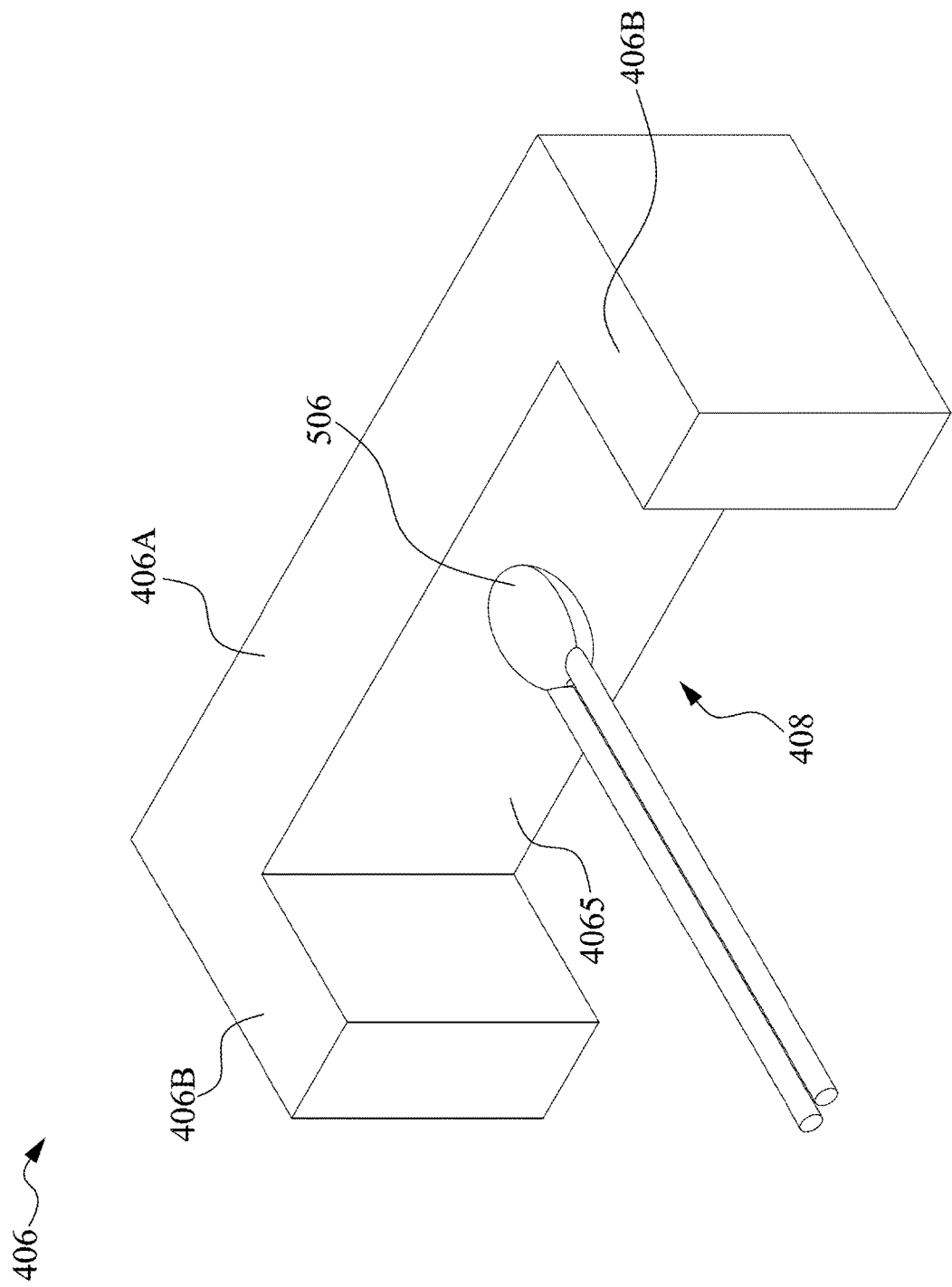

FIG. 2B is a schematic view of a thermally and electrically conductive element in accordance with some embodiments of the present disclosure. A thermally and electrically conductive element 406 in FIG. 2B is similar to the thermally and electrically conductive element 400 shown in FIGS. 1B and 1C. The difference therebetween is that the thermally and electrically conductive element 406 in FIG. 2B does not have trench or gap, and thus a thermal sensor 506 is disposed in an accommodation space 408 defined by a first portion 406A and two second portions 406B. Similarly, the thermal sensor 506 may be fixed on the inner surface 4065 of the thermally and electrically conductive element 406 by glue dispensing or screw locking.

Figure 3A:
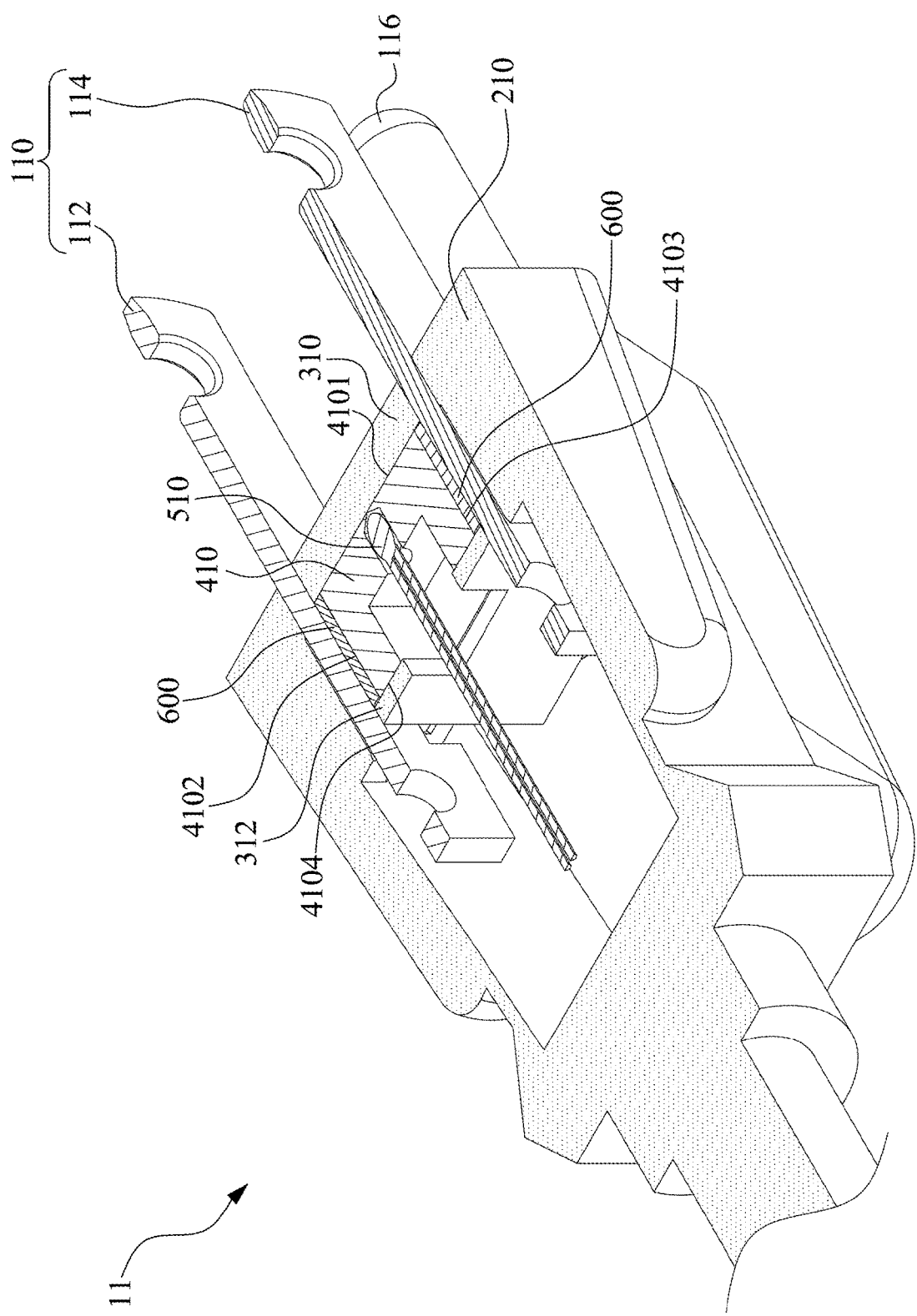
FIG. 3A is a perspective view of a power connector in accordance with some embodiments of the present disclosure.
Figure 3B:
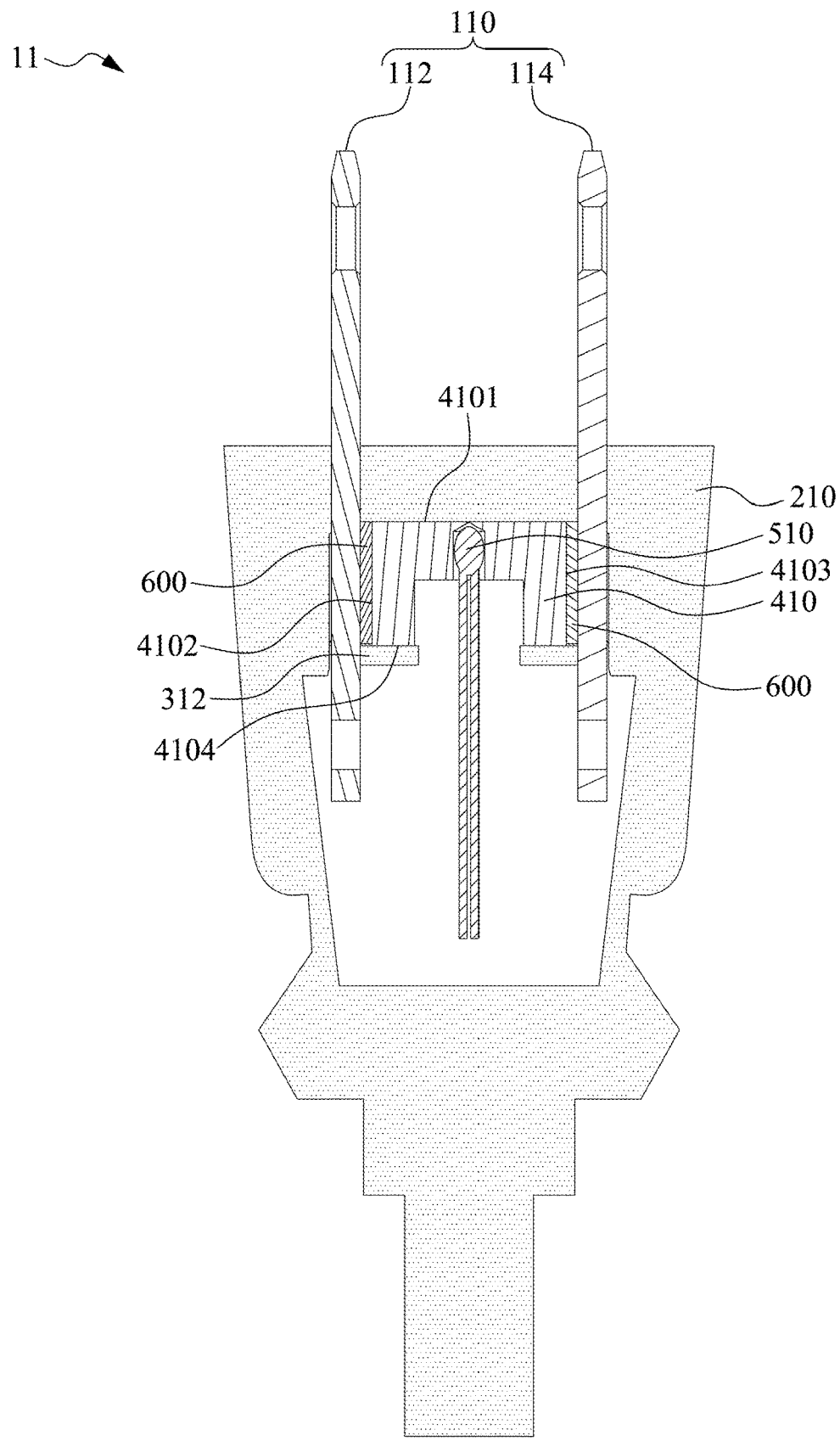
FIG. 3B is a cross-sectional view of the power connector in FIG. 3A.

FIG. 3A is a perspective view of a power connector in accordance with some embodiments of the present disclosure. FIG. 3B is a front view of the power connector in FIG. 3A. For clarity, descriptions similar to those described above are not stated again hereinafter.

A power connector 11 includes plural pins 110, an insulating body 210, a thermally and electrically conductive element 410, a thermal sensor 510, and plural insulating sheets 600. The pins 110 include a first pin 112, a second pin 114, and a third pin 116. The present embodiment is different from the aforementioned embodiments in that the insulating sheets 600 are disposed between the thermally and electrically conductive element 410 and the pins 110 respectively. In some embodiments, one of the insulating sheets 600 is disposed between the first pin 112 and the thermally and electrically conductive element 410, and another one of the insulating sheets 600 is disposed between the second pin 114 and the thermally and electrically conductive element 410. In some embodiments, the insulating sheets 600 are in direct contact with the thermally and electrically conductive element 410, the first pin 112, and the second pin 114.

The thermally and electrically conductive element 410 has two opposite side surfaces 4102 and 4103, in which the side surfaces 4102 and 4103 respectively face toward the first pin 112 and the second pin 114. In some embodiments, the area of the insulating sheets 600 is substantially equal to or larger than the area of the side surfaces 4102 and 4103, so as to entirely separate the thermally and electrically conductive element 410 from the pins 110. In other words, a top surface 4101 of the thermally and electrically conductive element 410 is covered by the first housing 310, the side surfaces 4102 and 4103 are covered by the insulating sheets 600, and a bottom surface 4104 is covered by the extension portion 312. In the present embodiment, the extension portion 312 does not extend from the first housing 310, but extends toward the cavity from other housings of the insulating body 210.

The insulating sheets 600 may be formed from an insulating material with good thermal conductivity, such as ceramic. In some embodiments, the insulating sheets 600 may be formed from aluminum oxide of which the conductivity is about 24 (W/m·k). In some embodiments, the insulating sheets 600 may be formed from aluminum nitride of which the conductivity is about 170 (W/m·k). Generally, the conductivity of the insulating sheets 600 is greater than that of the insulating body 210. The insulating sheets 600 may be formed in the insulating body 210 by insert molding. The insulating sheets 600 not only can spatially separates the thermally and electrically conductive element 410 from the first pin 112 and the second pin 114, but also can increase the heat transmission from the first pin 112 and the second pin 114 to the thermally and electrically conductive element 410 because of their higher thermal conductivity, thereby preventing heat loss during the heat conduction, thus increasing sensing accuracy.

Figure 4A:
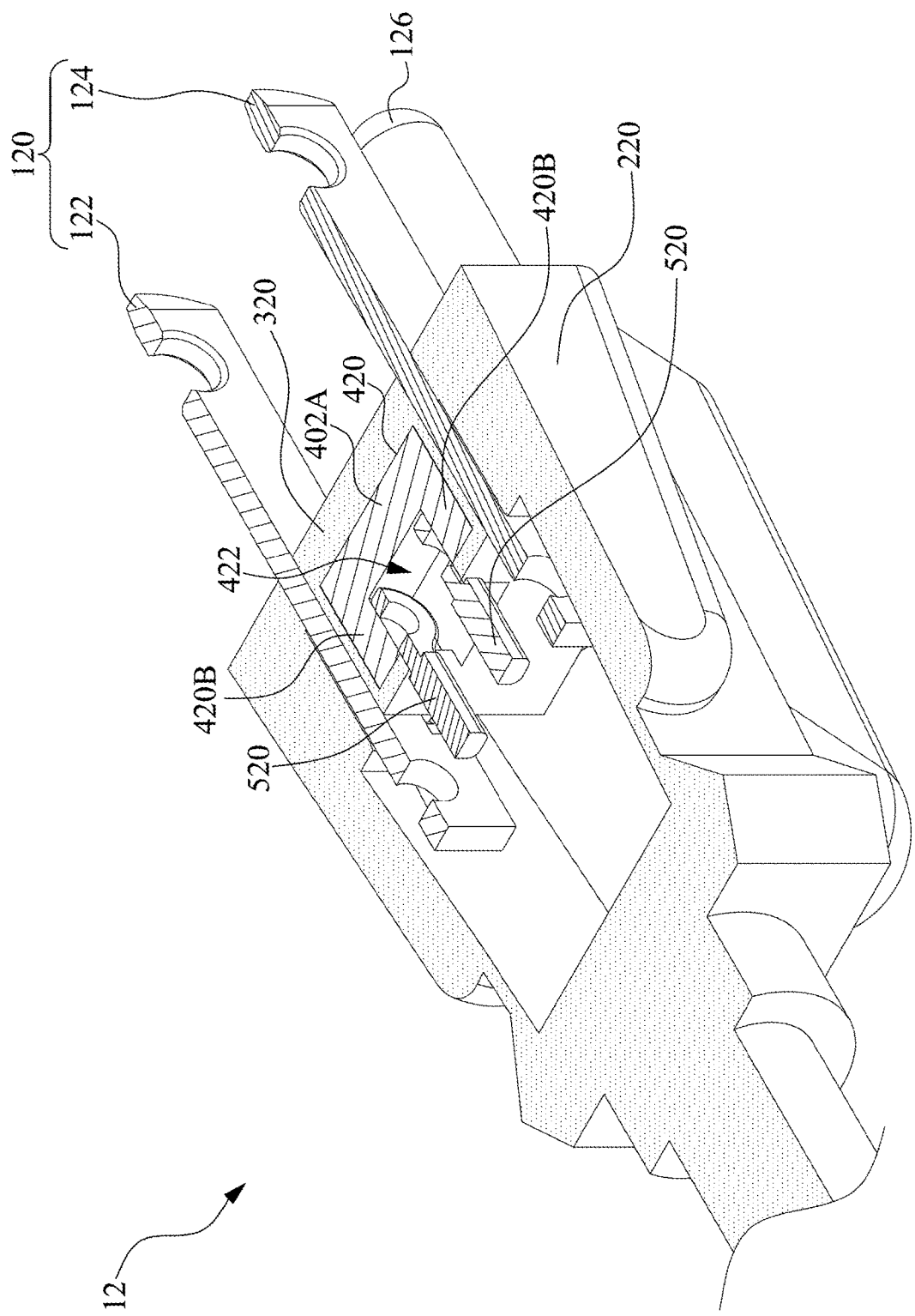
FIG. 4A is a perspective view of a power connector in accordance with some embodiments of the present disclosure.
Figure 4B:
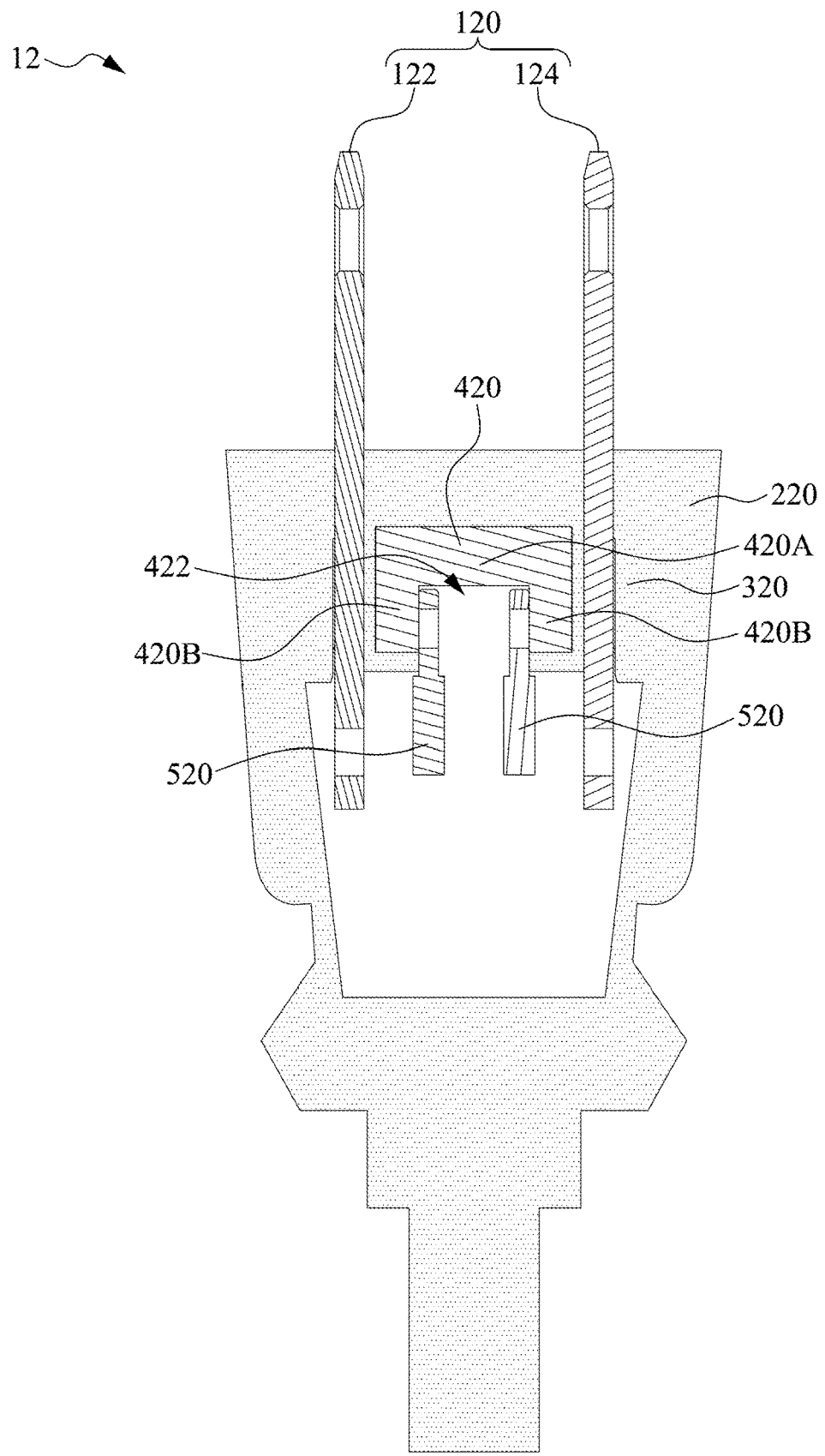
FIG. 4B is a cross-sectional view of the power connector in FIG. 4A.

FIG. 4A is a perspective view of a power connector in accordance with some embodiments of the present disclosure. FIG. 4B is a front view of the power connector in FIG. 4A. For clarity, descriptions similar to those described above are not stated again hereinafter.

A power connector 12 includes plural pins 120, an insulating body 220, a thermally and electrically conductive element 420, and plural thermal sensors 520. The pins 120 include a first pin 122, a second pin 124, and a third pin 126. In the present embodiment, the thermally and electrically conductive element 420 is in a U-shape. That is, the thermally and electrically conductive element 420 includes a first portion 420A and two second portions 420B. The extension direction of the first portion 420A crosses the extension direction of the second portions 420B, and the second portions 420B extend from opposite sides of the first portion 420A respectively. The first portion 420A and the second portions 420B collectively form an accommodation space 422.

The present embodiment is different from the aforementioned embodiments in that the number of the thermal sensors 520 is two, and the thermal sensors 520 are disposed in the accommodation space 422 of the thermally and electrically conductive element 420. Each of the thermal sensors 520 may be connected to one of the second portion 420B of the thermally and electrically conductive element 420. In other embodiments, each of the thermal sensors 520 may be connected to both of the first portion 420A and the second portion 420B. By increasing the number of the thermal sensors 520, the thermal sensors 520 are close to the first pin 112 and the second pin 114 respectively. As such, the sensing accuracy may be improved due to short thermal conductive paths. In the present disclosure, the thermal sensors 520 are fixed on the thermally and electrically conductive element 420 by screw locking, but the present disclosure is not limited thereto. In some embodiments, the thermal sensors 520 may also be fixed by glue dispensing. In some embodiments, the thermally and electrically conductive element 420 may include plural trenches similar to those described in FIGS. 1B and 1C. Further, the trenches may pass through the thermally and electrically conductive element 420, and the thermal sensors 520 may be fixed on the insulating body 220 (such as the first housing 320).

The present disclosure provides a power connector including plural pins, an insulating body, a thermally and electrically conductive element, and a thermal sensor. The insulating body includes a cavity and a first housing. The pins pass through and are disposed in the first housing. The thermally and electrically conductive element is disposed in the cavity. The thermally and electrically conductive element is close to the first housing, disposed between the pins, and is spatially apart from the pins. The thermal sensor is embedded in the thermally and electrically conductive element. In the present disclosure, the thermally and electrically conductive element can transfer heat to the thermal sensor effectively, and thus heat loss may be prevented, thereby improving the sensing accuracy.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power connector, comprising:
   an insulating body having a cavity and a first housing, wherein the first housing has a plug-in surface;
   at least two pins passing through the first housing, wherein one side of each of the pins extends to the cavity;
   a thermally and electrically conductive element disposed in the cavity, wherein the thermally and electrically conductive element extends toward and is spatially apart from the pins, and is close to the first housing; and
   at least one thermal sensor embedded in the thermally and electrically conductive element.

2. The power connector of claim 1, wherein the thermally and electrically conductive element is in direct contact with the first housing.

3. The power connector of claim 1, wherein the thermally and electrically conductive element comprises a first portion and two second portions connected to the first portion, wherein the second portions extend from opposite sides of the first portion, and an extension direction of the first portion crosses an extension direction of the second portions.

4. The power connector of claim 3, wherein the number of the thermal sensor is two, and the thermal sensors are fixed on the second portions respectively.

5. The power connector of claim 1, wherein the thermally and electrically conductive element has a trench, and the thermal sensor is disposed in the trench.

6. The power connector of claim 5, wherein the trench passes through the thermally and electrically conductive element such that a portion of the first housing communicates with the cavity through the trench, and the thermal sensor is fixed on the first housing through the trench.

7. The power connector of claim 1, wherein the insulating body further comprises an extension portion that is connected to the first housing and extends between the thermally and electrically conductive element and one of the pins for entirely separating the thermally and electrically conductive element from the one of the pins.

8. The power connector of claim 7, wherein the thermally and electrically conductive element has a top surface, a bottom surface opposite to the top surface, and two opposite side surfaces, wherein the top surface is close to the plug-in surface, and the side surfaces are respectively close to the pins, wherein the extension portion further covers the bottom surface of the thermally and electrically conductive element.

9. The power connector of claim 8, wherein the extension portion further extends from the bottom surface toward a direction away from the plug-in surface and forms a monolithic structure having two bent portions.

10. The power connector of claim 1, further comprising at least one insulating sheet disposed between the thermally and electrically conductive element and one of the pins for entirely separating the thermally and electrically conductive element from the one of the pins.

11. The power connector of claim 10, wherein a thermal conductivity of the insulating sheet is higher than that of the insulating body.

12. A power connector for a socket, comprising:
an insulating body comprising a plurality of housings that define a cavity and a plug-in surface;
at least two pins, wherein one side of each of the pins extends from the plug-in surface toward the cavity, and another side of each of the pins extends toward the socket;
a thermally and electrically conductive element that is entirely received in the cavity and is disposed between the pins, wherein the thermally and electrically conductive element has a top surface and two opposite side surfaces, and the top surface is close to the plug-in surface, and the side surfaces respectively correspond to the pins; and
at least one thermal sensor embedded in the thermally and electrically conductive element.

13. The power connector of claim 12, wherein the thermally and electrically conductive element is in a U-shape formed by a first portion and two second portions connected to the first portion, the plug-in surface covers the first portion, and the thermal sensor is embedded in the first portion and fixed on one of the housings.

14. The power connector of claim 12, wherein the thermally and electrically conductive element is in a U-shape formed by a first portion and two second portions connected to the first portion and defines an accommodation space, and the plug-in surface covers the first portion, wherein the number of the thermal sensor is two, and the thermal sensors are fixed in the accommodation space, and each of the thermal sensors is close to one of the pins.

15. The power connector of claim 12, wherein the insulating body further comprises a first extension portion that is connected to one of the housings and covers one of the side surfaces, such that the thermally and electrically conductive element is entirely insulated from the pins.

16. The power connector of claim 15, wherein the insulating body further comprises a second extension portion that is connected to the first extension portion and covers a bottom surface opposite to the top surface of the thermally and electrically conductive element.

17. The power connector of claim 16, wherein the insulating body further comprises a third extension portion that is connected to the second extension portion and extends toward a direction away from the plug-in surface, and the one of the housings, the first extension portion, the second extension portion, and the third extension portion are formed in a monolithic structure.

18. The power connector of claim 12, further comprising two insulating sheets disposed respectively between the thermally and electrically conductive element and the pins, wherein a thermal conductivity of the insulating sheets is higher than that of the housings.

19. The power connector of claim 18, wherein an area of the insulating sheets is substantially larger than or equal to an area of the side surfaces of the thermally and electrically conductive element.

20. The power connector of claim 18, wherein the insulating body further comprises an extension portion that extends from one of the housings and covers a bottom surface opposite to the top surface of the thermally and electrically conductive element.

21. The power connector of claim 18, wherein the thermally and electrically conductive element is in a linear shape.

* * * * *